Patented Aug. 10, 1943

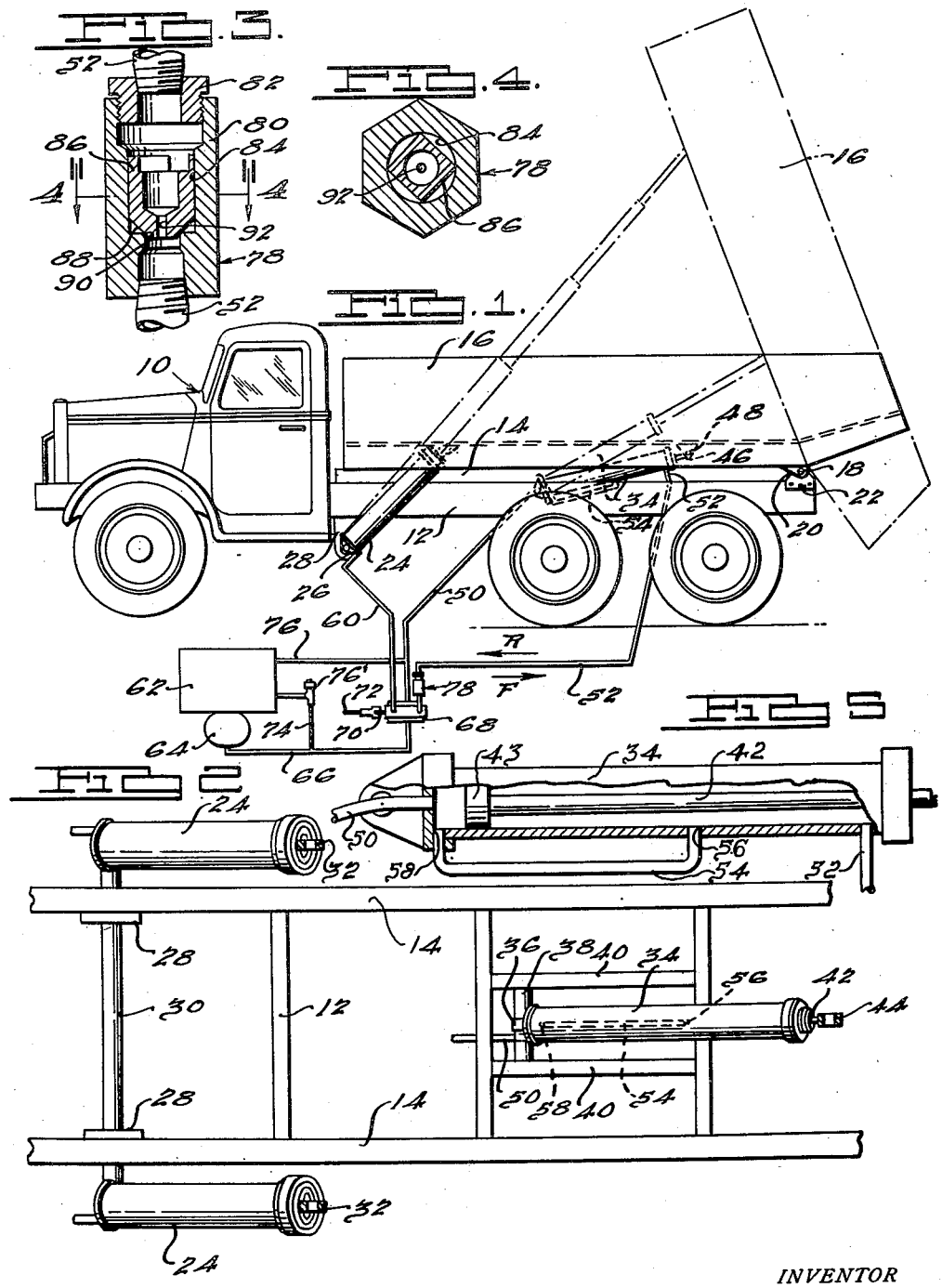

2,326,594

UNITED STATES PATENT OFFICE 2,326,594

DUMP VEHICLE CONSTRUCTION

Louis S. Wood, Grosse Pointe Farms, Mich., assignor to Gar Wood Industries, Inc., Detroit, Mich., a corporation of Michigan Application November 29, 1941, Serial No. 420,973

6 Claims. (Cl. 298—22)

The present invention relates to hydraulic hoist dumping of tiltably mounted vehicle dump bodies, and particularly relates to improvements in such structures where the body is tilted to a high angle.

One of the primary objects of the present invention is to provide improvements in the hoisting mechanism of high angle dump bodies by which the upward tilting of the body is cushioned and by which power is applied at the initial stages of the return.

A further object of the invention is to provide improvements in structures of the type mentioned in which elements of relatively simple construction may be employed, thereby providing economies in manufacture.

Other objects of the invention will become apparent from the following specification, the drawing relating thereto, and the claims hereinafter set forth.

In the drawing, in which like numerals are used to designate like parts in the several views throughout:

Figure 1 is a side elevational and diagrammatical view of a high angle dump body in which the fluid circuit providing the power is diagrammatically illustrated;

Fig. 2 is a fragmentary top plan view of a portion of the structure shown in Fig. 1;

Fig. 3 is a vertical cross sectional view of a check valve employed in the present invention;

Fig. 4 is a cross sectional view, taken substantially along the line 4—4 of Fig. 3; and Fig. 5 is an elevational and sectional view of one of the jacks and the hydraulic connections therewith.

Referring to the drawing, an automotive truck is generally indicated at 10, which includes a chassis 12 having longitudinally extended beams 14 fixed thereto. A dump body 16 is mounted on the chassis 12 and, in its lower or normally horizontal position, rests upon the longitudinal sill members 14 of the chassis. Such body 16 is pivotally connected to the chassis adjacent the rear end thereof by means of pivot pins 18 which are pivotally received within aligned openings in brackets 20 and 22, mounted on the body and chassis, respectively.

In order to hoist or tilt the body about pivots 18 from the position shown in full lines in Fig. 1 to the high angle position shown in broken lines, hoisting means are provided which include a pair of oppositely disposed hydraulic rams 24. Such rams may be of the type disclosed in the Louis S. Wood Reissue Patent No. 20,812, granted July 26, 1938. The extensible hoists or rams 24 are preferably of the telescope type which include an outer cylinder having downwardly projecting ears 26 fixed to the base end thereof, each of such ears being provided with a pivot opening therethrough. In order to mount the rams 24 to the chassis 12 depending brackets 28 are fixed to the chassis on opposite sides thereof, in the embodiment illustrated adjacent the rear of the track cab. A transversely extended pivot shaft 30 is mounted to the lower ends of the brackets 28 and projects beyond the sides of the chassis. The ends of the shaft 30 are received through the pivot openings in the ears 26 of the rams 24 so that such rams are pivotally connected to the chassis.

The telescoped hoists include a plurality of telescopically received cylindrical members which are slidably disposed within each other and within the outer cylinder. The innermost one of such cylinders has the cap end closed and has an integral eye 32 formed therewith which is connected by a pivot pin to the underside of the body 16. Thus, each of the rams 24 is pivotally connected to the body through the pivot eye 32.

Another hydraulic jack 34, which is preferably of the cylinder or plunger type, is connected to the chassis 12 and the body 16, and is disposed between the rams 24 and body pivots 18. There is one of such jacks 34 provided in the embodiment illustrated and the base end of the cylinder is pivotally connected through a pivot eye 36 with a pivot shaft 38. Such pivot shaft 38 is connected to longitudinally extending frame members 40 which are in turn suitably fixed to the chassis 12.

A reciprocating piston rod 42 having a piston 43 projects through the cap end of the cylinder and is provided at the outer end with a pivot eye 44. Such pivot eye 44 is pivotally connected through a pivot pin 46 with depending brackets 48 mounted on the underside of the body 16. The jack 34 is thus pivotally connected to the chassis 12 and to the body 16.

The jack 34 is provided with an inlet and outlet port in the base end of the cylinder which communicates with a fluid conduit 50. Another port is provided through the cylinder adjacent the cap end for communicating a conduit 52 with the interior thereof. A by-pass conduit 54 is provided which communicates with the interior of the cylinder through a port 56 which is located substantially midway between the ends of the cylinder and through another port 58 which is located adjacent the base end of the cylinder. The purpose and function of the by-pass conduit 54 will be described in detail hereinafter.

The fluid under pressure for the jack 24 is provided through a conduit 60 which communicates with the interior thereof through a port located in the base end of the outermost cylinder of the ram 24. The fluid under pressure for the telescoped jack 24 is thus supplied through the conduit 60 and the fluid from the jack is also exhausted through the conduit 60.

An hydraulic circuit for supplying the fluid under pressure to the jacks 24 and 34, and for controlling the flow of fluid to and from said jacks, is provided which includes a fluid or oil reservoir 62 having a conduit adjacent the bottom thereof which communicates with the intake side of an hydraulic pump 64. Such pump 64 may be of conventional construction and is driven in the usual way from a power take-off associated with the truck engine. An outlet conduit 66 communicates with the outlet side of the pump 64 and communicates with the inlet of a conventional 4-way open center hydraulic valve 68. Such valve includes the usual reciprocating plunger, and a control or shifter 70 is connected to the plunger. Such control 70 is provided with a suitable connection 72 which leads to a convenient location in the cab so that the valve plunger may be shifted to its different positions in order to operate the hydraulic jacks 24 and 34 in a manner that will be hereinafter described.

A recirculating conduit 74, having a pressure relief valve 76′ inserted therein, communicates with the conduit 66 and returns to the tank so that when the valve 68 is in its closed position the pump 64 may continuously operate to recirculate the fluid back to the tank.

The conduit 60 communicates with the proper one of the valve ports in valve 68, the conduit 50 communicates with another proper one of the valve ports of valve 68, and the conduit 52 communicates with another proper one of the valve ports in the valve 68. A return conduit 76 communicates with the conduit 50 and returns to the tank 62.

In general, the operation is such that fluid under pressure may be supplied the jacks or rams 24 to extend them to the position shown in broken lines in Fig. 1. As the body is hoisted, the jack 34 is extended and the fluid within the cylinder 34 on the cap side of the piston 43 returns through conduit 52. A check valve generally indicated at 78 is inserted in the conduit 52 so that the return of fluid passing through conduit 52 is restricted in its flow into valve 68.

The valve 78 is illustrated in detail in Figs. 3 and 4, and includes a housing 80 provided with a longitudinal bore therethrough. The conduit 52 communicates with the bore through opposite ends of the housing 80, the lower end being provided with a tapped opening and the upper end provided with a bushing 82.

The housing bore 84 is cylindrical in transverse section, and a check valve plunger 86 is disposed within the bore 84 for longitudinal movement therein. Such plunger 86 is square in transverse section over the major portion of the length thereof and terminates in a frusto-conical lower end 88. Such frusto-conical end 88 is adapted to seat on the circular shoulder 90 of the housing 80. The plunger 86 is provided with a longitudinal bore therethrough which terminates in a restricted passageway 92 in the lower end thereof.

When fluid under pressure is introduced into the lower end of the housing 80 through conduit 52, it will be appreciated that the plunger 86 is moved upwardly away from the seat 90 so that there is free flow of fluid through the spaces between the square sides of the plunger 86 and the bore 84. The sides of the upper ends of the plunger 86 are cut away to provide passageways for the fluid through the top opening in the housing and into the upper section of the conduit 52. The flow of fluid through the check valve 78 in that direction is unrestricted.

When, however, the flow of fluid is downwardly through the check valve it will be appreciated that the plunger 86 is moved downwardly against the seat 90 so that the flow of fluid is restricted through the restricted passageway 92. Thus when fluid under pressure is supplied the rams 24 to raise the body, the connection of the piston rod 42 of the jack 34 with the body will cause an extension of such jack 34. The upper movement of the plunger 43 within the jack 34 will force the fluid first through the by-pass conduit 54 back into the base end of the cylinder and through the conduit 50 so that such fluid will return unrestricted to the tank through conduit 76. When the plunger 43 has passed the mid port communicating with the by-pass conduit 54, the fluid under pressure is forced through conduit 52 and such flow is restricted in its passage through check valve 78 so that the extension of the jack 34 is checked. Thus the jack 34 serves as a cushion element during the later stages of the hoisting.

When the valve 68 is set so that fluid under pressure is passed into conduit 52 it will be seen that the fluid exerts a force on the upper side of the piston within jack 34 and causes a return force to be applied to the body 16. Such force is only effective on the body during the initial stages of lowering in that as soon as the piston on jack 34 passes the mid port of by-pass 54, the fluid under pressure entering jack 34 from conduit 52 is by-passed around the piston through conduit 54 and returns to the tank through conduits 50 and 76. At this setting of the valve the conduit 60 communicates with conduit 50 through the valve and the fluid from the jacks 24 is thus returned to the tank through conduit 76.

From the above description it will be apparent that the present invention provides a construction by which a body may be hoisted to a high angle of tilt and in which the body is cushioned or checked as it approaches its highest angle of tilt. Furthermore, such body may be powered down during the initial stages of lowering. The powering down is only advantageous at such stages in that as soon as the body has started down its own weight will carry it to normal horizontal position.

What is claimed is:

1. A dumping vehicle construction comprising a frame, a body pivotally mounted on said frame for tilting movement with respect thereto, an hydraulic means for tilting said body, said hydraulic means including an hydraulic ram connected to said body and to said frame for hoisting said body, an hydraulic jack connected to said body and to said frame, and means providing an hydraulic power circuit operatively connected to said ram and to said jack, said last named means being so constructed and arranged as to supply fluid power to said ram to hoist said body and to supply fluid power to said jack to lower said body.

2. A dumping vehicle construction comprising a frame, a body pivotally mounted on said frame for tilting movement with respect thereto, an hydraulic means for tilting said body, said hydraulic means including an hydraulic ram connected to said body and to said frame for hoisting said body, an hydraulic jack connected to said body and to said frame, and means providing an hydraulic power circuit operatively connected to said ram and to said jack, said last named means being so constructed and arranged as to supply fluid power to said ram to hoist said body and to supply fluid power to said jack to lower said body at the initial stages of lowering only.

3. A dumping vehicle construction comprising a frame, a body pivotally mounted on said frame for tilting movement with respect thereto, an hydraulic means for tilting said body, said hydraulic means including an hydraulic ram connected to said body and to said frame for hoisting said body, an hydraulic jack connected to said body and to said frame, and means providing an hydraulic power circuit operatively connected to said ram and to said jack, said last named means being so constructed and arranged as to supply fluid power to said ram to hoist said body and to supply fluid power to said jack to lower said body at the initial stages of lowering, after which said fluid supplied to said jack is by-passed therearound.

4. A dumping vehicle construction comprising a frame, a body pivotally mounted on said frame for tilting movement with respect thereto, an hydraulic means for tilting said body, said hydraulic means including an hydraulic ram connected to said body and to said frame for hoisting said body, an hydraulic jack connected to said body and to said frame, and means providing an hydraulic power circuit operatively connected to said ram and to said jack, said last named means being so constructed and arranged as to supply fluid power to said ram to hoist said body and to restrict the flow of fluid from said jack during the supplying of fluid to said ram.

5. A dumping vehicle construction comprising a frame, a body pivotally mounted on said frame for tilting movement with respect thereto, an hydraulic means for tilting said body, said hydraulic means including an hydraulic ram connected to said body and to said frame for hoisting said body, an hydraulic jack connected to said body and to said frame, and means providing an hydraulic power circuit operatively connected to said ram and to said jack, said last named means being so constructed and arranged as to supply fluid power to said ram to hoist said body, to supply fluid power to said jack, to lower said body at the initial stages of lowering and to restrict the flow of fluid from said jack during the supplying of fluid power to said ram.

6. A dumping vehicle construction comprising a frame, a body pivotally mounted on said frame adjacent the rear end thereof for tilting movement with respect thereto, an hydraulic means for tilting said body, said hydraulic means including an hydraulic ram connected to said body and to said frame for hoisting said body, an hydraulic jack disposed between said ram and the pivot connection of said body with the frame and connected to said body and to said frame, and means providing an hydraulic power circuit operatively connected to said ram and to said jack, said last named means being so constructed and arranged as to supply fluid power to said ram to hoist said body and to restrict the flow of fluid from said jack during the hoisting of said body.

LOUIS S. WOOD.